UNITED STATES PATENT OFFICE.

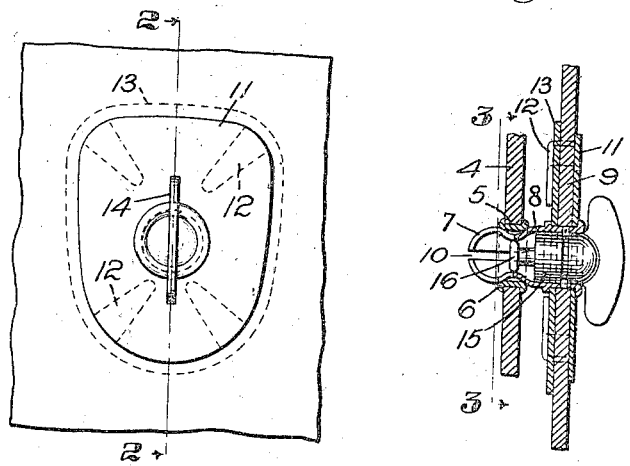
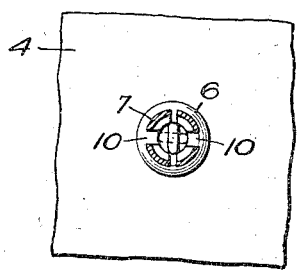

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,300,580.  Specification of Letters Patent.  Patented Apr. 15, 1919.

Application filed November 2, 1917.  Serial No. 199,836.

*To all whom it may concern:*

Be it known that I, FRED S. CARR, a citizen of the United States, and a resident of Newton, in the county of Middlesex, Commonwealth of Massachusetts, (whose post-office address is care of Carr Fastener Company, Cambridge, Massachusetts,) have invented an Improvement in Fasteners, of which the following description, in connection with the accompanying drawings, is a specification, like characters on the drawings representing like parts.

This invention pertains to improvements in separable fasteners, and more particularly, though not exclusively, to improvements in fasteners for attaching the curtains of automobiles to sheet metal portions of the car. Among the objects of the invention are to provide a fastener, simple and inexpensive in construction, strong and durable, and which admits of the use of a socket on the body of the car which contains little or no mechanism, and which lies practically flush with the side of the car.

Referring to the drawings, which show one illustrative embodiment of my invention:

Figure 1 is a front elevation of a preferred form of my invention;

Fig. 2 is a section on the line 2—2 of Fig. 1; and

Fig. 3 is a section, partly in elevation, on the line 3—3 of Fig. 2.

In the preferred form of my invention selected for illustrative purposes, I have shown the sheet metal side of a car 4 having an aperture 5 formed therein, this aperture preferably being protected by a gromet 6, and being adapted to receive the head 7 of an expansible and contractible stud 8 secured to a curtain 9.

The stud 8 may be of any suitable construction, but I prefer that it shall be died from a flat sheet of metal, and, for a considerable portion of its length, provided with a slit 10, permitting contraction thereof when the stud is pushed through the gromet 6 and of sufficient resiliency to expand after passing through the gromet 6 so as to hold the stud in firm engagement with the socket.

It is important that that portion of the fastener which is carried by the body of the car contain no mechanism which is likely to get out of order, because the inside of the sheet metal plate 4 is usually concealed behind the upholstery or other interior finish of the car. It is also highly desirable that, as shown, there be little or no projection from that portion of the fastener attached to the sheet metal plate 4, so that the exterior of the car may present a smooth and finished appearance.

The stud 8 may be secured to the curtain 9 in any suitable manner, but I prefer to provide an outside plate 11 having prongs 12 projecting therefrom and adapted to pass through openings in the inside plate 13, about which the prongs 12 may be clenched as shown. While the stud 8 may be maintained in the socket 5 solely by the resiliency of the material of which the stud is made and the tendency of the head 7 of the stud to remain in expanded position, I prefer to provide locking means for holding the head 7 of the stud in expanded position when the stud is entered in the socket. A preferred form of locking means comprises a turn-button 14 exterior to the curtain and having a shank 15 having a bearing on the interior of the stud and controlling a cam 16 attached to the end thereof, the cam 16, when turned to the position shown in Figs. 2 and 3, opposing contraction of the head 7 of the stud and thereby preventing withdrawal of the stud from the socket, while when turned ninety degrees said cam 16 registers with the slit 10 in the stud and permits contraction of the head of the stud so that the stud may be withdrawn from the socket.

While I have shown and described one embodiment of my invention, it will be understood that changes involving omission, alteration, substitution and reversal of parts, and even changes in the mode of operation, may be made without departing from the scope of my invention, which is best defined in the following claim.

Claim:

A fastener comprising, in combination, a socket formed by an aperture in a plate, a stud for expansive engagement with said socket, cam means for positively locking said stud in expanded position, and turn-button means extending axially of the stud for locking said stud in expanded position.

In testimony whereof, I have signed my name to this specification.

FRED S. CARR.